Figure 1:
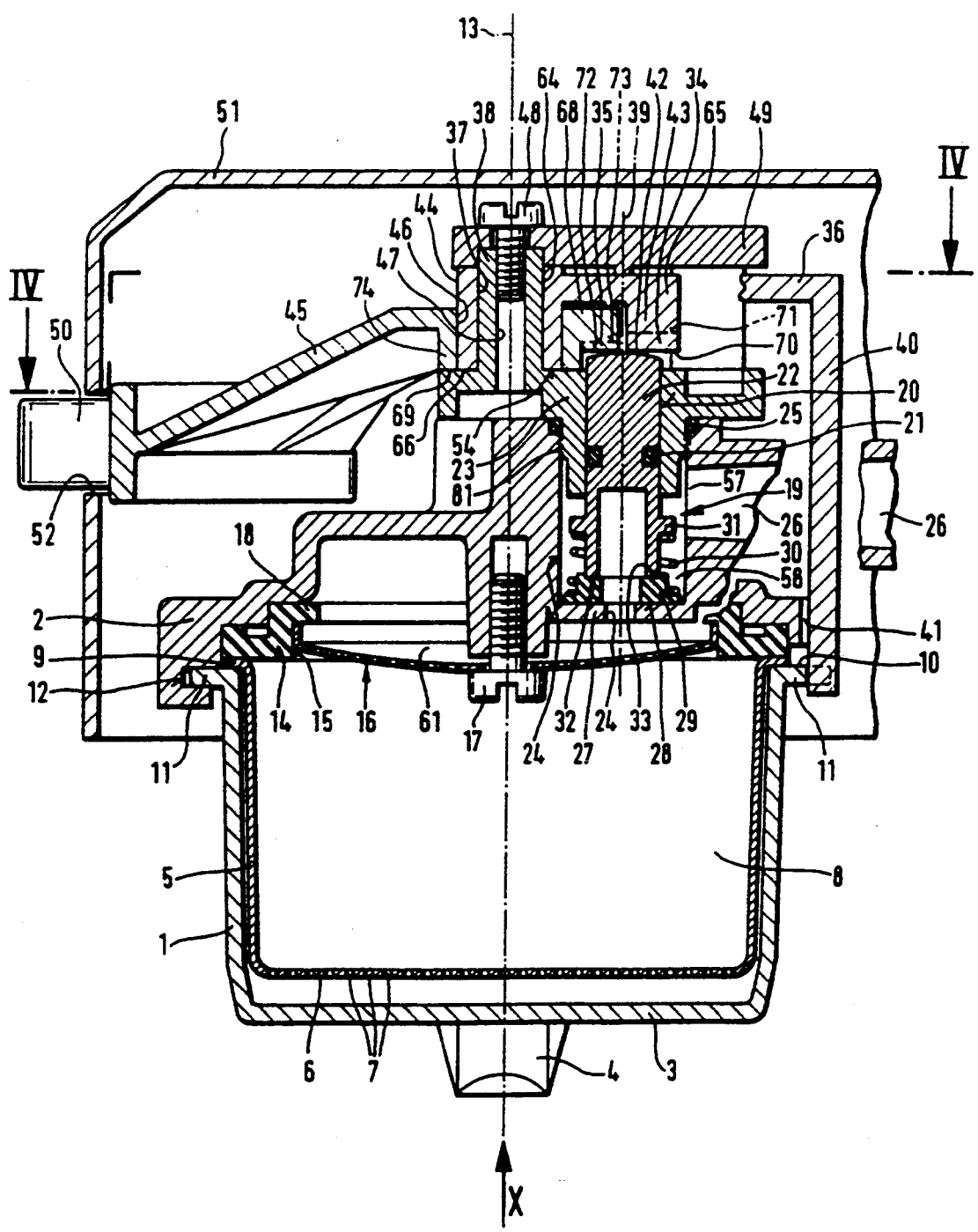

United States Patent [19]

Hufnagl

[11] Patent Number: 5,388,502
[45] Date of Patent: Feb. 14, 1995

[54] ESPRESSO COFFEE MACHINE

[75] Inventor: Walter Hufnagl, Sulzbach, Germany

[73] Assignee: Braun Aktiengesellschaft, Frankfurt, Germany

[21] Appl. No.: 977,432

[22] PCT Filed: Jul. 16, 1991

[86] PCT No.: PCT/DE91/00594

§ 371 Date: Feb. 22, 1993

§ 102(e) Date: Feb. 22, 1993

[87] PCT Pub. No.: WO92/03081

PCT Pub. Date: Mar. 5, 1992

[30] Foreign Application Priority Data

Aug. 22, 1990 [DE] Germany .................. 4026495

[51] Int. Cl.$^6$ .................................. A47J 31/24
[52] U.S. Cl. .................................. 99/295; 99/302 R
[58] Field of Search ............... 99/279, 280, 283, 286,
99/289 R, 293, 295, 294, 299, 300, 302 R;
426/433

[56] References Cited

U.S. PATENT DOCUMENTS

| 2,451,195 | 10/1946 | Brown . | |
| 4,429,623 | 2/1984 | Illy | 99/295 |
| 4,632,024 | 12/1986 | Cortese | 99/293 |
| 4,660,466 | 4/1987 | Fries | 99/295 |

FOREIGN PATENT DOCUMENTS

| 0313496 | 4/1989 | European Pat. Off. . |
| 373387 | 4/1923 | Germany . |
| 350778 | 1/1961 | Switzerland . |

OTHER PUBLICATIONS

Saeco, "Expresso Coffee Pot" Brochure (undated).
Gaggia Brochure (undated).

Primary Examiner—Robert W. Jenkins
Attorney, Agent, or Firm—Fish & Richardson

[57] ABSTRACT

An espresso coffee machine including an electrically heatable water heater, a filter basket holder, and a filter basket holding device which can be sealingly closed by introducing therein the filter basket holder. The filter basket holder is subdividable by a filter into a brewing chamber that can be filled with coffee grounds and into a pouring device arranged at its bottom. The coffee machine further includes a first duct and a second duct having a steam outlet. The first duct opens into the filter basket holding device so as to connect the brewing chamber to the water heater and it includes a through-flow controlling valve arranged therein which is always closed when the filter basket holder is not inserted. After the filter basket holder is inserted into the machine, the filter basket holder causes the valve to move from its closed into an open position. There is also a first actuating member provided between the filter basket holder and the valve which is actuated by the filter basket holder to control the valve. Steam can be taken from the espresso coffee machine through the second duct in order to steam and froth beverages, the steam being produced in the water heater as well. In addition to the first actuating member, a second actuating member is provided which also serves to control the valve. The valve opens only if both the first and the second actuating member have adopted their open positions.

27 Claims, 5 Drawing Sheets

ESPRESSO COFFEE MACHINE

The present invention relates to an espresso coffee machine with an electrically heatable water heater, with a filter basket holding device which can be sealingly closed by introducing therein a filter basket holder, the said filter basket holder being subdivided by a filter into a brewing chamber that can be filled with coffee grounds and into a pouring device arranged at its bottom, the said brewing chamber being connectible to the water heater by a duct opening into the filter basket holding device.

Espresso coffee machines of this type have been selling for a long time. For instance, an espresso coffee machine is distributed by Messrs. SAECO s.r.l., Silla, Bologna, Italy, under the trade name "Bonjour moka", wherein the brewing chamber which is arranged in the filter basket holder and can be filled with coffee grounds links to a duct that opens into the filter basket holding device and, in turn, connects to an electrically operated water heater producing hot water. Interposed in the duct between the brewing chamber and the water heater is a throughflow controlling valve that is adapted to be opened or closed, respectively, by hand through an actuating member designed as a turning lever on the top side of the housing, in order to open or close the supply of hot water into the brewing chamber. The water heater in this espresso coffee machine is an electrically heatable air-pressure tank which, in the presence of excess pressure, pumps boiling water or overheated steam to the brewing chamber.

By way of actuating the turning lever, the valve can adopt its closed position in this espresso coffee machine so that no water is delivered to the brewing chamber. This position is chosen by the user when it is desired to discharge steam out of the steam boiler via the steam pipe, with the steam valve arranged at the rear area of the housing being open. For instance, when the steam pipe is then immersed into cold milk, this milk will be steamed and simultaneously frothed so that thick and frothy cappuccino results after espresso coffee has been added. However, the valve must be closed also in the event that, after an espresso coffee has been prepared, the filter basket holder shall be removed safely from the filter basket holding device, with no hot water continuing to flow out of the filter basket holding device.

If in this espresso coffee machine—shortly after e.g. milk has been frothed and the steam valve has been closed—the valve serving for the throughflow control is opened by swinging up the turning lever, hot water and finally hot steam, too, can exit explosion-like out of the filter basket holding device due to the prevailing pressure in the steam boiler, if the filter basket holder has not been introduced in the filter basket holding device. The explosion-like deflagration is still magnified by the fact that the water heated to roughly 120 to 130 degrees Celsius in part will evaporate abruptly when it enters the atmosphere. This large-surface deflagration of hot water or steam, respectively, may cause unpleasant burns on the hand of a user. However, this may also occur in those instances when a user removes the filter basket holder from the filter basket holding device or places it thereon without having closed the valve beforehand.

In the espresso coffee machine "Espresso GAGGIA" of Messrs. BREVETTI GAGGIA Spa. Robecco/Naviglio, too, hot water will exit from the filter basket holding device, namely in the event that the electric pump governing the throughflow control is switched on by turning on the pump switch and the filter basket holder is not introduced into the filter basket holding device. This happens also on heating up of the machine, since the fast heating up causes the expanding water which often entrains hot steam to exit from the filter basket holding device. This may also cause burns on the hand.

Therefore, it is an object of the present invention to improve upon an espresso coffee machine, no matter whether it is operated by a pump or by a steam boiler, to such effect that, if the filter basket holder is not inserted, it is prevented that brewing water or overheated steam will exit from the filter basket holding device, and that boiling water or overheated steam may exit from the filter basket holder only if said has been properly inserted into the filter basket holding device.

This object is achieved by the present invention in that a throughflow controlling valve is arranged in the duct in a manner known per se, in that the valve is always closed when the filter basket holder is not inserted, and in that, after the insertion of the filter basket holder, the latter causes the valve to assume its open position. Owing to the present invention, a safety arrangement is obtained which permits hot water to exit from the filter basket holding device only after the filter basket holder has been properly inserted into the filter basket holding device, which water may enter into the brewing chamber of the filter basket holder, from where—after brewing water has been poured on the espresso coffee grounds—the espresso coffee flows through the filter and leaves through the pouring device the filter basket holder, from where it is finally conveyed into a cup positioned underneath the filter basket holder.

Such a safety arrangement according to the present invention can be made use of both in pump-operated and in steam-boiler-operated espresso coffee machines. Steam or hot water pouring out of the filter basket holding device in all directions, what very often takes place in an explosion-like deflagration, is avoided by the present invention, so that there will be no more unpleasant burns if a hand remains inadvertently in the area underneath the filter basket holding device. Opening of the valve can be effected directly by the filter basket holder or by any other electrical or mechanical transmission members to be activated by the filter basket holder. Even if the user has introduced the filter basket holder into the filter basket holding device, it is admitted that hot water can pour out of the pouring device provided on the filter basket holder, but due to the pouring device having a comparatively small diameter this by far not as dangerous as with the larger opening formed at the filter basket holding device which has an exhaust aperture many times larger.

It is only scarcely possible in many cases to position the valve assembly in the filter basket holding device such that the valve can be brought into direct contact with the filter basket holder. It is advantageous in these cases in an improvement upon the present invention that a first actuating member is provided between the filter basket holder and the valve which is actuated by the filter basket holder to control the valve. A mechanical connection between the filter basket holder and the valve is established by the first actuating member provided independently of the filter basket holder in the filter basket holding device. In this embodiment, the valve can be arranged in the duct at any location desired. However, the first actuating member can also be an electric switch, for instance, adapted to be activated by the filter basket holder and controlling an electromagnet which actuates the valve. Instead of a purely mechanical solution, this would be an electromechanical solution which will not be dealt with more closely in the present invention though.

It is particularly favourable that the introduction of the filter basket holder is performed by an axial displacement directed towards the filter basket holding device, that the first actuating member is a turning lever, the one end of which is so pivoted about its point of support due to the axial displacement which occurs when the filter basket holding device is closed by the filter basket holder, that, in doing so, an actuating element formed at the turning lever opens the valve. That is to say, the axial displacement occurring when the filter basket holder is locked at the filter basket holding device is made use of for actuating the valve in this embodiment. This axial displacement can be produced, for instance, when the filter basket holder is fastened by a thread arrangement or ramp arrangement between the filter basket holder and the filter basket holding device. However, other possibilities of attachment are also possible, yet it is mandatory that an axial displacement results when the filter basket holder is attached and sealed in the filter basket holding device.

Favourably, the filter basket holder is inserted in that it is turned by means of projections into a thread or into a bayonet lock arrangement, in that the first actuating member is a first lever rotatable about an axis, whose free end is rotated about its axis by the closing movement of the filter basket holder such that a first actuating element provided on the first lever opens the valve. A like valve actuation can be realised particularly easily in conventional espresso coffee machines, since the filter basket holder is normally coupled to the filter basket holding device by way of a bayonet lock arrangement, which permits to quickly insert and lock the filter basket holder so that a rotating movement results automatically. This rotating movement will then be transmitted directly to the first lever so that said follows a rotating movement as well. A turning lever offers the further advantage that small valve piston travels can be covered even in the event of larger angles of rotation at the filter basket holder and thus also at the first lever. This is because large angles of rotation at the first lever permit the user to recognize from far away the position the first lever has adopted, i.e. whether it is in the position in which the valve is open or that in which the valve is closed.

When the filter basket holder is inserted, the free end of the first lever is engaged in a recess shaped at it according to an improvement upon the present invention. It is always ensured due to this forced guidance of the free end of the first lever on the filter basket holder that, on turning of the filter basket holder, no matter whether into the removal position or into the closing position, the first lever, too, is indeed turned in conformity with the turning of the filter basket holder.

In another embodiment, the first lever is entrained only in the direction of the valve closing position, e.g. by the filter basket. It is favourable in this event that a spring makes catch at the first lever which automatically restores the first lever into its initial position closing the valve, when the filter basket holder is detached from the filter basket holding device. Even in the event of a forced guidance of the lever, as has been described hereinabove, a spring causing the lever to assume its initial position can be advantageous, in order that the lever will not move into its centre position in case the espresso coffee machine is exposed to vibrations, so that the engagement of the free end of the lever in the recess would be possible no more.

It is expedient that the valve is formed by a valve piston which is axially slidable in the housing of the filter basket holding device and by a valve seat opened and closed, respectively, by the valve piston, that the valve piston is acted upon by a spring for the purpose of automatic opening of the valve, that the valve piston with its free end projects from the housing of the filter basket holding device and is sealed in relation to the housing, that, with the valve closed, the first actuating element designed on the first lever abuts on the free end of the piston and presses said against the valve seat in the housing of the filter basket holding device, while, for opening that valve, the free end of the first lever is turned by the filter basket holder such that the first actuating element moves out of the range of effect of the valve piston and the valve piston lifts from the valve seat. That is to say, in this valve assembly, the actuating element of the first lever must press constantly on the free end of the valve piston, in order to urge said to sealingly rest on the valve seat, whereby the passage of the duct to the brewing chamber is interrupted. As soon as the actuating element of the first lever releases the valve piston, the valve piston will lift from the valve seat under the action of spring force and opens the passage from the first duct to the brewing chamber arranged in the filter basket holder so that an espresso coffee beverage can be made.

Slow opening and closing, respectively, of the valve is achieved in a favourable manner in that the area of the actuating element on the first lever facing the free end of the valve piston is a slide configured as a first ramp, and in that the first ramp increases its distance to the free end of the valve piston in the closing direction of the filter basket holder. Depending on how large the inclination of the first ramp is chosen to be, the valve can open or close quickly or more slowly depending on the angle of rotation of the first lever.

To prevent the valve piston, which is subjected to the force of the spring in the opening direction, from turning the first lever into the opening position releasing the valve, without the user having actuated the first lever, and in order that, simultaneously, the valve piston in its opening position will not jump out of its guide bore, it is arranged for in an improvement upon the present invention that adjacent to the first ramp on both sides is a slide in the form of abutment surfaces, which extend perpendicular to the longitudinal axis of the valve piston, and that the two horizontally extending abutment surfaces are disposed within the closing angle of the filter basket holder. The longitudinal axis of the valve piston may be inclined to a certain degree in relation to the slide. The only thing important is that, when the slide makes catch at the valve piston, the latter will still adopt its closing or opening position, respectively.

A particularly simple and low-cost arrangement of the valve assembly results in that the first lever extends substantially perpendicular to the longitudinal axis of the valve piston and the axis of the first lever, in that the free end of the first lever extending towards the filter basket holder is angled off in relation to the horizontally extending area of the first lever and extends in parallel to the longitudinal axis of the piston and the axis of the first lever, and in that the free end is movable into operative engagement with a stop designed on the filter basket holder, which is arranged on the filter basket holder radially outside a sealing joint at the filter basket holding device. From this ensues a particularly simple and easy assembly which avoids undesirable transverse forces on the movable parts. Simultaneously, the direct conversion of force brings about a valve assembly which affords ease of motion and long useful life.

There being no need to carry out modifications compared to the series production design, the lever assembly is designed such that the filter basket holder is adapted to be coupled to the filter basket holding device by way of a bayonet lock arrangement, and such that the bayonet lock element on the side of the filter basket holder forms the stop for the free end of the first lever.

Since steam, too, is produced in the up-to-date steam-boiler-operated espresso coffee machines which is almost imperative for the additional preparation of cappuccino, it is suggested in an improvement upon the present invention that steam can be taken from the espresso coffee machine through a second duct provided with a steam outlet for the purpose of steaming and frothing beverages, the said steam likewise being produced in the water heater, that, in addition to the first actuating member, a second actuating member is provided which also serves to control the valve, and that the valve opens only if both the first and the second actuating member have adopted their open position.

The second lever which, for a steam-boiler-operated espresso coffee machine, acts upon the valve in addition to the first lever will permit opening of the valve—although the first lever has been caused by the filter basket holder to assume its position opening the valve—only if it has been caused to assume its position opening the valve as well. That is to say, if the filter basket holder is not introduced into the filter basket holding device, the first lever cannot be actuated by the filter basket holder, and the second lever, even it if has assumed its opening position, cannot bring about opening of the valve, since the first lever continues to keep the valve closed, even if the second lever in its opening position opens the valve. Consequently, steam cannot pour out of the filter basket holding device in the closed position of the valve, it is merely allowed that steam flows to the steam outlet opening serving to prepare cappuccino, however, this being possible only if the steam valve is open which is provided additionally at the second duct.

Since the steam pressure and, thus, the temperature in the steam boiler are controlled by a thermostat, inadmissibly high steam pressure cannot develop in the steam boiler, not even if the steam valve and the valve are closed. Should this occur nevertheless, a pressure-relief valve is provided as a safety means on the cover closing the steam boiler, through which latter valve the excessively high pressure is then discharged into the atmosphere.

There is no need for a second actuating member according to the present invention in those pump-operated espresso coffee machines, in which steam is produced in a steam heater that is designed independently of the water heater and produces steam only in the event that water flows through a drip valve coupled to the water tank into the steam heater, from where it flows as steam through the second duct, which is not linked to the first duct to the steam outlet. For this reason, all improvements upon this invention which concern the second lever are intended for use in steam-boiler-operated espresso coffee machines only.

According to a first design variant of the valve of the instant invention, the first and the second actuating member comprises a first and, respectively, a second actuating element which can be brought into contact with the valve, the filter basket holder being inserted in that it can be turned by way of projections into a thread or into a bayonet lock arrangement, the first and the second actuating member being a first and a second lever rotatable about a first axis, the valve being formed by a valve piston axially slidable in the housing of the filter basket holding device and by a valve seat opened and, respectively, closed by the valve piston, the said valve piston being acted upon by a spring for the purpose of automatic opening of the valve, and the valve piston at its free end being adapted to be acted upon by each one first and second actuating element designed on the first and the second lever, the valve being sealed in relation to the housing, wherein, with the valve closed, the first and, respectively, the second actuating element abut with preload on the free end of the valve piston, while, for opening the valve, the first and the second actuating element are disposed outside the range of effect of the free end of the valve piston by the free end of the first lever being turned by the filter basket holder, and by the second actuating element, when turned by hand, also moving out of the range of effect of the valve piston.

For closing the valve, the valve piston in this valve assembly is pressed into the housing by the first and, respectively, the second actuating element in opposition to the preloading force of the spring. As soon as both actuating elements move out of the range of effect of the valve piston, that means they no longer keep it in its closed position, it will detach automatically from the sealing seat caused by the preloading force of the spring and move a distance out of the housing. In doing so, it releases the duct so that water may flow out of the pressure tank through the duct to exit at the filter basket holding device, where it is pumped by the steam boiler pressure into the brewing chamber filled with espresso coffee grounds.

To be able to accomplish a longitudinal displacement of the valve piston by minimum lever force, and in order to attain a movement of the valve piston directed into the housing for the purpose of closing the valve, a first and, respectively, a second slide designed as a ramp are provided both at the first and the second actuating element in the area close to the free end of the valve piston, the distance of the first and the second slide increasing in relation to the free end of the valve piston in the closing direction of the filter basket holder.

In order that possibly both ramps abut with the same force on the valve piston in the closed position of the valve and that, consequently, on turning out of one lever the other lever continues to reliably close the valve, the first and the second ramp extend substantially in the same plane and in parallel to each other in the closing position of the first and the second lever.

Owing to the slide seat arrangement between the valve piston and the actuating elements, the actuating members can be mounted particularly easily in the filter basket holding device, since the levers merely have to be slipped and axially secured on their axes. When the second lever is pivoted on a second axis provided on the first lever, and when the ramps of the first and the second lever configured as slides extend concentrically relative to each other, opposite to the free end of the valve piston and radially one behind the other, when viewed from the axis, only one axis is required on the filter basket holding device for supporting the levers. The slides are arranged such in relation to the valve piston in the closed position of the valve that the first actuating element, when viewed from the axis, beyond the centre line of the valve piston abuts on said's free end, while the second actuating element on this side of the centre line of the valve piston abuts on said's free end.

In order that a user can freely choose, whether to produce steam in order to heat up a beverage and to froth it at the same time, or whether to produce hot water for preparing an espresso coffee, it is favourable that the second lever can be operated by hand.

To keep the overall height of the valve assembly and hence also the overall height of the filter basket holding device as small as possible, it is advantageous that the first axis is formed by a peg, on which the first lever is supported by way of a first bore, and that the first lever comprises a cylindrical peripheral surface on the outside wall of the first bore, on which surface the second lever is supported by way of a second bore provided on the second lever. Owing to the two actuating members being supported on only one axis, the design and the mounting of the valve assembly will be facilitated greatly.

In an improvement upon the present invention, it is proposed that the first lever is supported on the first axis above the second lever, and that, outside the second lever, a first projection is formed on the first lever in the area of the valve piston, which projection represents the first actuating element, which is directed towards the valve piston and on the end surface of which close to the valve piston the first ramp is provided. The first lever extending over the second lever permits the second lever to take support on a comparatively large surface on the first lever in the opening direction of the valve piston so that possibly occurring transverse forces will not result in the second lever getting hooked. It is also rendered possible hereby that the free end of the first lever can be arranged to be offset in relation to the free end of the second lever, thereby permitting ease of coupling to the filter basket holder.

To allow the second lever to be provided on the front side of the espresso coffee machine for ease of handling, and to prevent it from colliding with the first lever, it is expedient that the distance between the second ramp of the second lever and the first axis is less than the distance between the first ramp of the first lever and the first axis.

In a second embodiment of the valve assembly and the actuating device depending on it, it is proposed in a favourable manner that the first and the second actuating member comprises a first and, respectively, a second actuating element controlling the valve, that the filter basket holder is inserted by being turned by way of projections into a thread or a bayonet lock arrangement, that the first and the second actuating member is formed by a first and a second lever rotatable about an axis, that the valve is formed by a valve piston axially slidable in the housing of the filter basket holding device and by a valve seat opened and closed, respectively, by the valve piston, that the valve piston is acted upon by a spring for the purpose of automatic closing of the valve, that on its free end the valve piston can be acted upon by each one first and second actuating element provided on the first and the second lever, that the valve is sealed in relation to the housing, that the first lever is additionally arranged to be slidable towards the valve piston, that, when after one of the two levers has been turned into the position serving to open the valve, the other lever, too, is turned to assume the opening position serving to open the valve, both actuating elements of the levers act upon each other such that the first lever is displaced in the opening direction of the valve piston on a second axis arranged on the second lever, thereby opening the valve.

That is to say, in this second embodiment of the valve assembly, the valve piston is moved in exactly the opposite direction compared to the first embodiment for the purpose of opening the valve. The advantage is that, if the valve piston is stuck fast or is jammed tight in the valve bore in the event of non-use of the espresso coffee machine for a longer period of time, the valve piston will be forced by the first actuating member to shift into its open position for opening the valve, when the second member has already adopted its position opening the valve. The valve piston will free itself from its impeded motion in the valve bore so that, subsequently, it can move on its own again to assume its closing position caused by the preloading force of the spring, once the two actuating members are turned out of the range of effect of the valve piston.

While in the first embodiment of the valve assembly the two actuating elements are arranged side by side irrespective of one another, that means opposite to the valve piston, in the second embodiment of the valve assembly, the two actuating elements are arranged one behind the other in the longitudinal direction of the valve piston, and that actuating element which is turned the last into its position opening the valve is shifted inbetween like a wedge, so that the first actuating member is displaced in the longitudinal direction of the valve piston and, in doing so, slides the valve piston into its valve bore. As a result, the sealing seat provided on the valve piston lifts from the sealing seat formed in the housing, and the duct to the brewing chamber is released.

Since the first actuating member is turned in a concealed fashion when the filter basket holder is inserted and, in the event that the first lever has already assumed its ready position opening the valve, i.e. is in the espresso coffee making mode, since it is simultaneously displaced in a concealed fashion in the longitudinal direction of the valve piston with a view to opening the valve, this course of motion will not concern the outer contour of the espresso coffee machine, since the first lever is integrated in the housing of the filter basket holding device to be inaccessible from the outside.

In order to bring about in a simple fashion an axial longitudinal shift on the first actuating element that is directed towards the valve piston, it is arranged for in an improvement upon the present invention that the area of the first actuating element on the first lever close to the second lever is a first slide configured as a first ramp, and that the first ramp is descending when viewed in the closing direction of the filter basket holder. It is an advantage of the first ramp provided on the first lever that, with a very insignificant descent, the valve, too, opens but very slowly in dependence on the angle of rotation of the filter basket holder. For instance, if the steam boiler is subjected to its maximum operating pressure, the brewing water will not flow abruptly into the brewing chamber when the valve is opening slowly, so that undesirable turbulences in the espresso coffee grounds are avoided. This is because flow stress ratios similar to those in a pump-operated espresso coffee machine are to be attained by the slow opening of the valve.

When the first or the second lever or both together are turned, the first ramp formed on the first lever will slide along an edge or surface provided on the second lever, so that the first lever is displaced in axial direction towards the valve piston and thereby moves said to assume its opening position. However, it is of course also possible that, instead of the first ramp being provided on the first lever, it can also be provided on the second lever, whereby eventually the same result will be obtained.

It is particularly favourable that, in addition to the first ramp provided on the first lever, a second slide configured as a second ramp is provided on the area of the second lever that is close to the first lever, and that the second ramp extends substantially in parallel to the first ramp. Owing to the ramps sliding on each other, both levers can be actuated especially easily by little rotational force.

According to an improvement upon the present invention, the second lever is pivoted directly on the first axis, and the first lever is pivoted on a second axis arranged on the second lever. That is to say, in this second embodiment of the lever assembly, the first lever is supported through a second axis arranged on the second lever, and the latter second lever, in turn, is supported on the first axis on the filter basket holding device, while this is just vice-versa in the first embodiment. Consequently, it is exclusively the first lever which establishes the contact with the valve piston in the second embodiment, whereas in the first embodiment both levers can act directly on the valve piston.

If a ramp is provided on only one of the two levers, both levers can have the same direction of rotation for opening the valve. If, however, ramps are provided on both levers, the direction of rotation of the first lever is opposite to the direction of rotation of the second lever for opening the valve, in order to permit the ramps to move towards each other and to get into operative engagement so that they can slide on each other.

To permit the first lever to be actuated at all by the filter basket holder, it must extend up to the range of effect of the filter basket holder. It is favourable that the first lever extends substantially perpendicular to the longitudinal axis of the valve piston and the first axis of the first lever, that the free end of the first lever extending to the filter basket holder is angled off in relation to the horizontally extending area of the first lever and extends in parallel to the longitudinal axis of the piston and the first axis of the second lever, and that the free end is movable into operative engagement with a stop provided on the filter basket holder, the said stop being arranged on the filter basket holder radially outside a sealing connection provided on the filter basket holding device. Since the first lever with its angled-off free end displaces towards the valve piston in the second embodiment, there must be free space for this area at the filter basket holding device.

In order to avoid an explosion-like exit of the water on the valve when said is opened quickly, for instance, if the inclination of the ramps was chosen to be comparatively steep, according to an improvement upon the present invention, a throttle designed as a reducing valve is arranged in the valve or downstream thereof in the first duct towards the brewing chamber. The said throttle may also be formed by the valve itself in that the opening cross-section of the valve is sized but so large that an explosion-like deflagration of the water under pressure when exiting into the brewing chamber is avoided.

Figure 4:
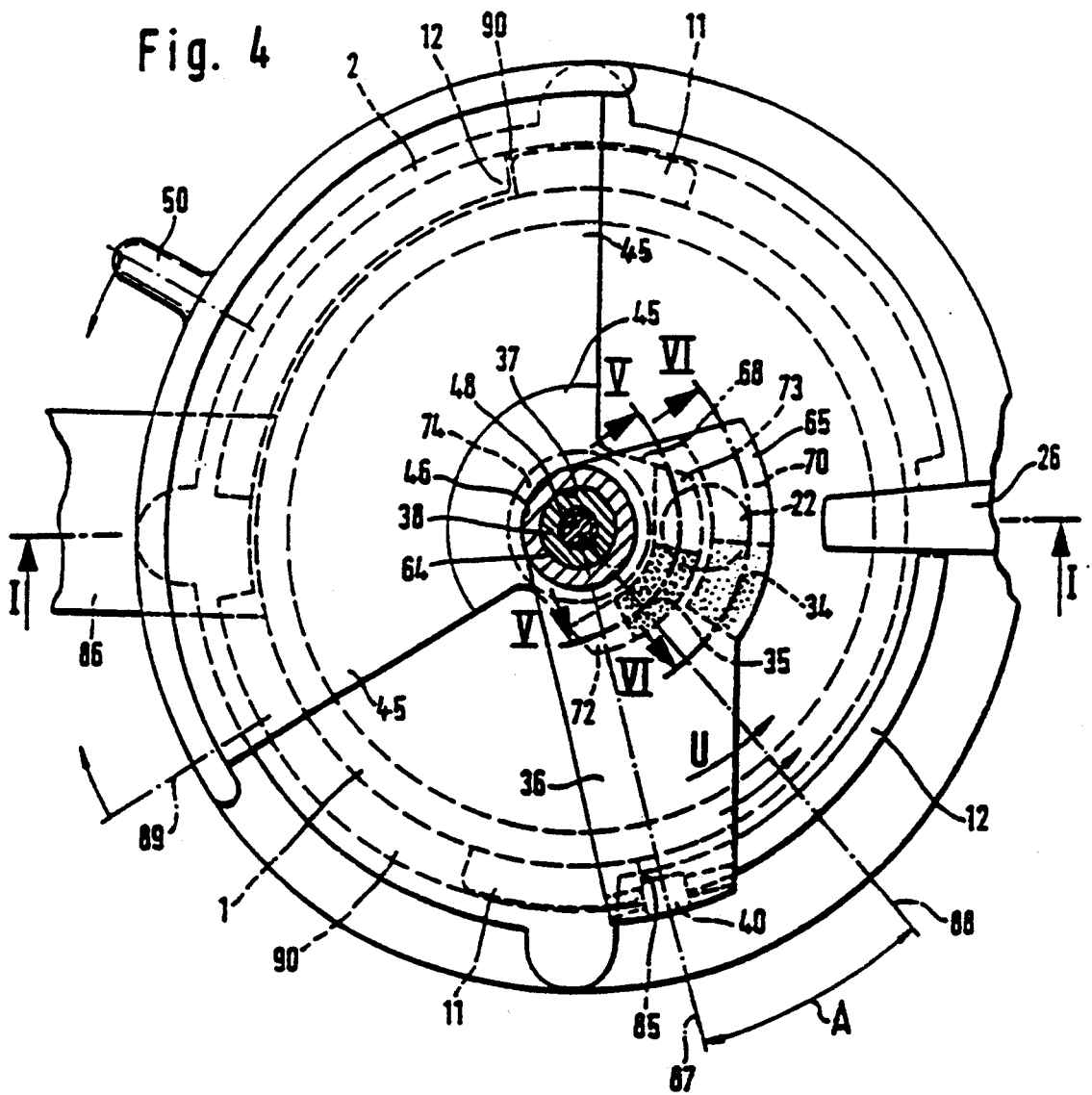
Figure 5:
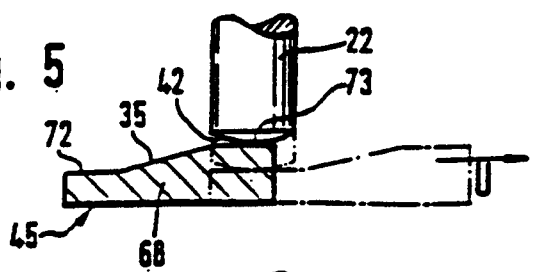
Figure 6:
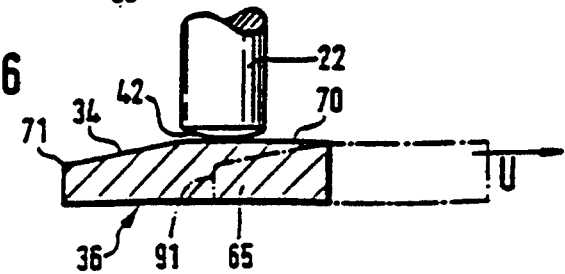
Figure 8:
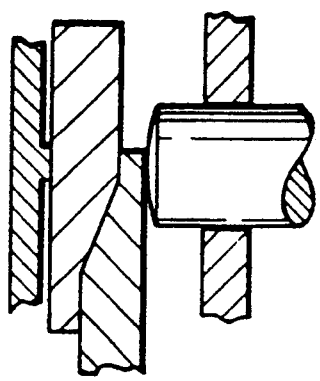
Figure 9:
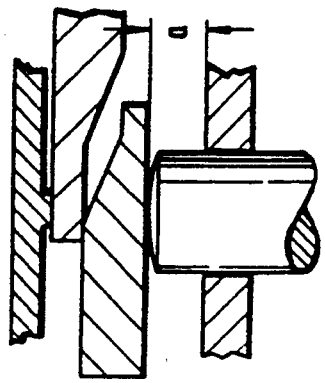
Figures 7, 10:
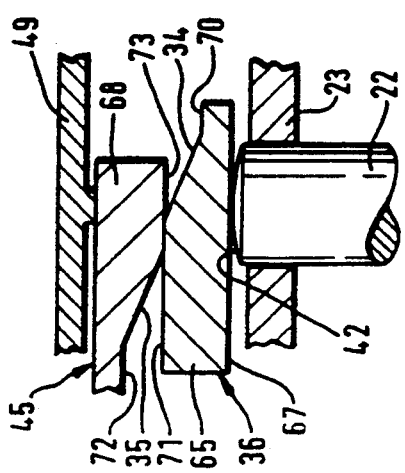

Several embodiments of the present invention are illustrated in the drawings and will be explained in more detail hereinbelow. In the drawings, FIG. 1 is a longitudinal cross-section of a filter basket holding device of an espresso coffee machine taken along the line of intersection I—I of FIG. 4 according to a first embodiment, wherein both levers act directly upon the valve piston and keep it in its closed position against the force of a spring, and wherein the free end of the first lever has been turned into the drawing's plane, FIG. 2 is a filter basket holding device according to FIG. 1, however, with a second embodiment of a lever and valve assembly, wherein only one lever acts directly upon the valve piston, and wherein the valve reaches its closed position only when the first lever does not exert force on the valve piston, FIG. 3 is a longitudinal cross-section through a second valve modified in comparison with the second embodiment according to FIG. 2, the filter basket holding device being illustrated in outlines only, FIG. 4 is a cross-section taken along the line of intersection IV—IV in FIG. 1, wherein the two levers keep the valve in its closed position, and wherein the filter basket holder disposed farther below and part of the filter basket holding device are illustrated in outlines only, FIG. 5 is a cross-section through the second actuating element with its second ramp, provided on the second lever, FIG. 6 is a cross-section through the first actuating element with its first ramp, provided on the first lever, FIG. 7 is a cross-section taken through the two actuating elements of the two levers taken along the line of intersection X—X in FIG. 2, wherein the filter basket holder is inserted properly into the filter basket holding device and, simultaneously, the second lever has adopted the position for espresso coffee making, FIG. 8 is a partial cross-section according to FIG. 7, however, the difference being that the lever is in the steam operation position, FIG. 9 is a partial cross-section according to FIG. 7, however, the difference being that the filter basket holder is not inserted into the filter basket holding device and the second lever is in the position for making espresso coffee nevertheless, and FIG. 10 is a partial cross-section according to FIG. 9, however, the difference being that the second lever is in the steam operation position.

Figure 2:
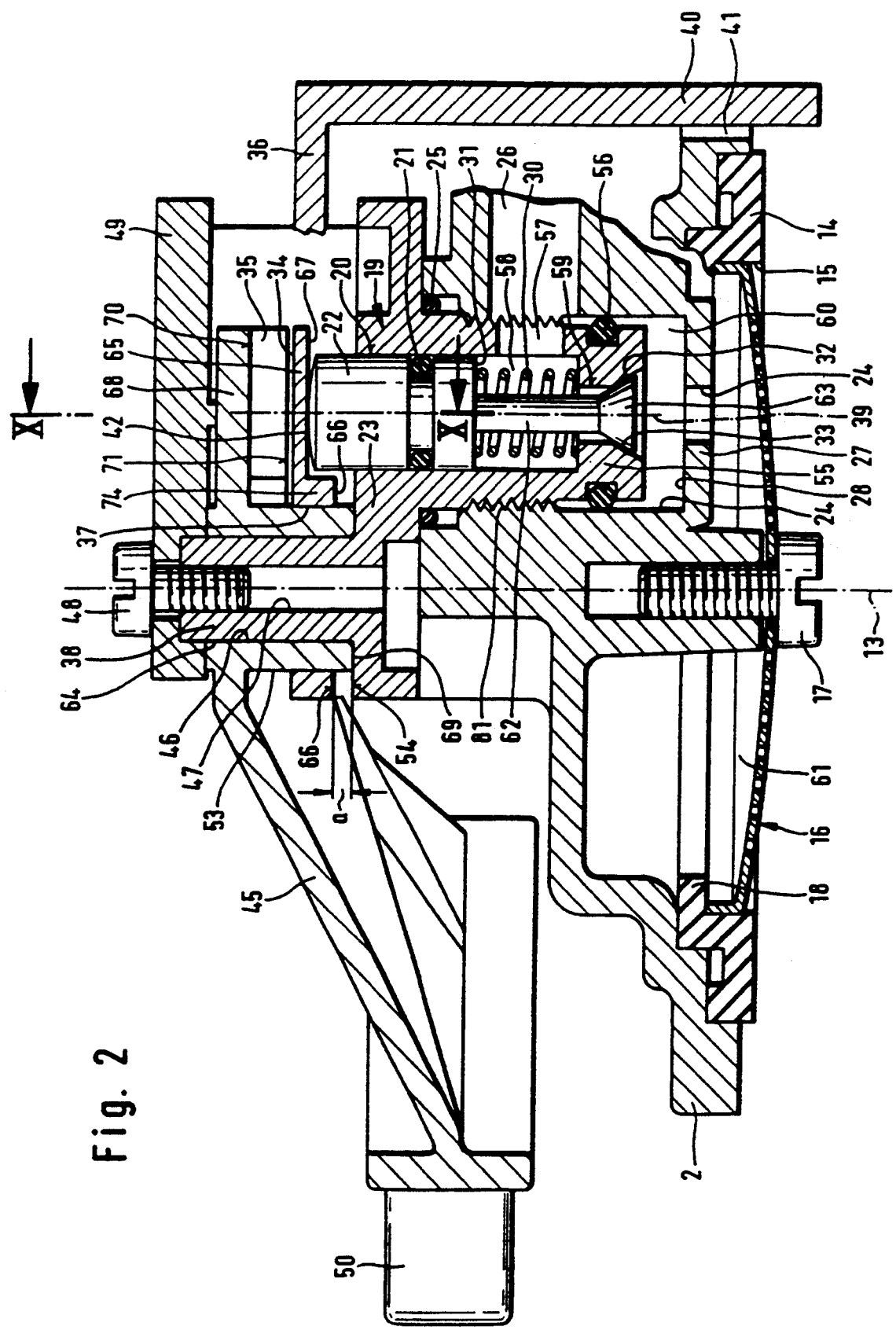
Figure 3:
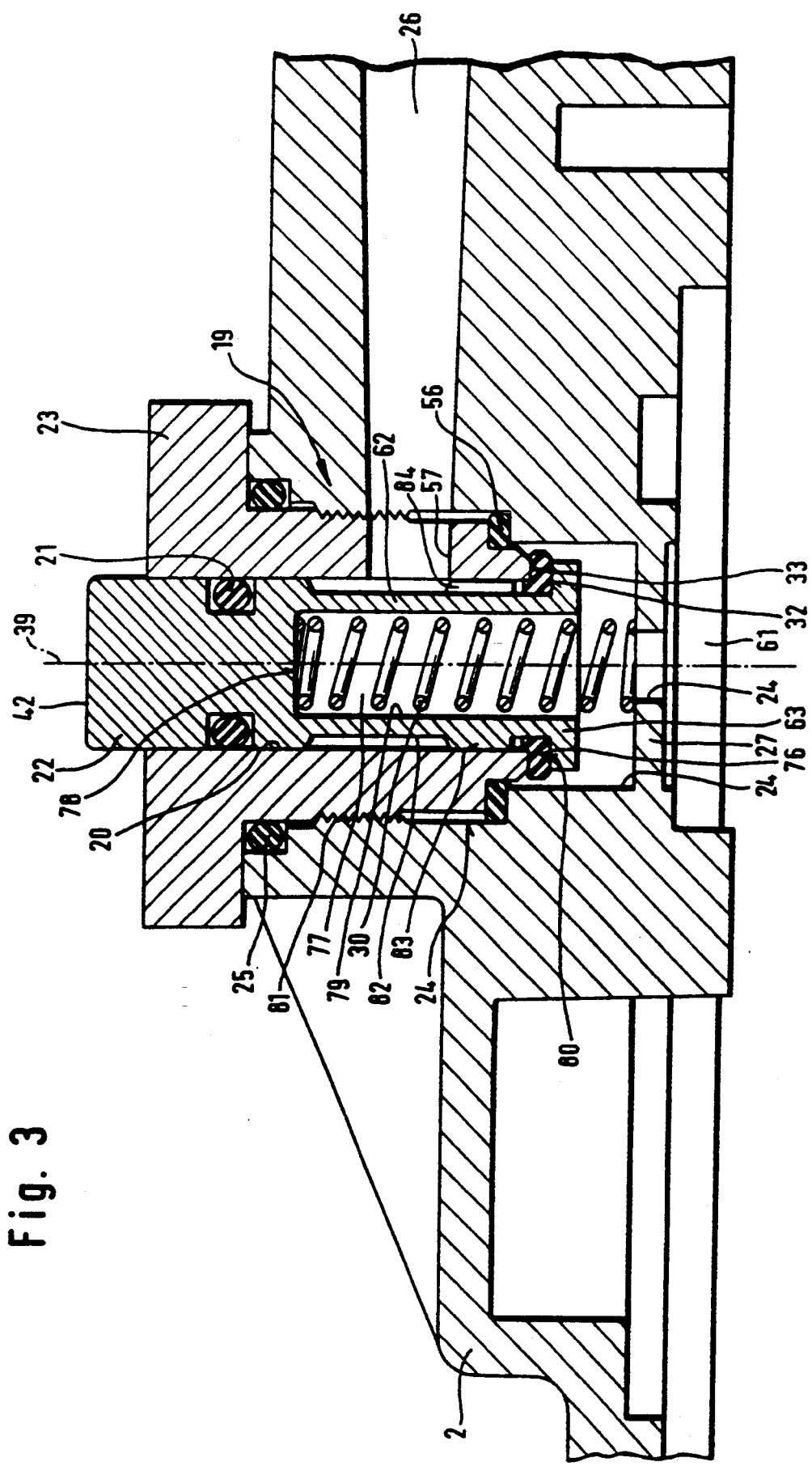

FIGS. 1 to 3 illustrate in a longitudinal cross-sectional view only that portion of the filter basket holding device 2 of the espresso coffee machine that is disposed above the filter basket holder 1. The other parts of the espresso coffee machine such as e.g. steam boiler, heating, steam boiler cover, steam duct for producing steam, switch, housing etc., have not been illustrated for the sake of simplicity, since they concern the actual invention only marginally. To avoid repetitions, identically functioning component parts have been assigned like reference numerals in FIGS. 1 to 10.

The filter basket holder 1 is substantially of bowl-shaped design and contains in its bottom 3 at least one outlet 4, which serves as a pouring device and from which the espresso coffee made pours out into a cup placed below the filter basket holder 1 that is not either shown herein. A bowl-shaped filter basket 4 is placed in the filter basket holder 1 which has in its bottom 6 a plurality of small-diameter passages 7 and forms the actual filter of the espresso coffee machine. Instead of the filter basket 5, of course, the present invention also permits to introduce a filter screen into the filter basket holder so that a filter screen holder is also meant by the term filter basket holder.

In FIG. 1, the chamber 8 formed by the filter basket 5 serves to receive the espresso coffee grounds and, thus, forms the actual brewing chamber 8, which is isolated from the pouring device 4 by the filter basket 5. At its upper end in the drawing, this filter basket 5 is provided with an outwardly directed annular collar 9, which abuts on the upper end on the front surface 10 of the filter basket holder 1 and takes support thereon, so that the bottom 6 of the filter basket 5 furnished with the passages 7 will always be at a certain distance from the bottom 3 of the filter basket holder 1.

According to FIGS. 1 and 4, the outside periphery of the upper rim of the filter basket holder 1 is provided with radially protruding and circle-ring-segment-shaped projections 11, which are engaged into groove portions 12 shaped on the filter basket holding device 2. These projections 11 together with the groove portions 12 form the bayonet lock arrangement, which is provided in filter basket holders 1 of espresso coffee machines in a manner known per se, due to which, on insertion of the filter basket holder 1 and its subsequent turning in the filter basket holding device 2, the end surface 10 according to FIG. 1 is displaced axially in the longitudinal direction of the centre line 13 upwardly so far that the annular collar 9 is pressed into sealing abutment on a ring seal 14 attached to the filter basket holder 1, so that the brewing chamber is sealingly connected with the filter basket holding device 2.

The ring seal 14 of FIG. 1 contains a central bore 15, into which a second filter 16 is inserted which, in turn, is held in the filter basket holding device 2 by a screw 17 and which, together with the bore, forms a distribution chamber 61. Since the second filter 16 according to FIG. 1 abuts from the bottom against an annular collar 18 which is arranged on the ring seal 14 and serves as a stop, the ring seal 14 is likewise retained in position on the filter basket holding device 2 through the filter 16 and the screw 17. The second filter 16 confines the brewing chamber 8 towards the filter basket holding device 2 and, on the one hand, is meant to provide that the brewing water dripping from the top through the distribution chamber 61 onto the second filter 16 is distributed evenly over the surface of the second filter 16, so that it can enter under pressure over a large surface into the brewing chamber 8. On the other hand, contamination caused by the espresso coffee grounds at the valve assembly 19, that is provided in the filter basket holding device 2, and in the supply duct 26 is avoided.

The valve assembly 19 in FIG. 1 consists of a valve bore 20 which extends in parallel to the centre line 13 and above the second filter 16 in the filter basket holding device 2, in which bore a valve piston 22 is arranged axially slidably that is sealed in relation to the valve bore 20 by means of a ring seal 21. The ring seal 21 is secured to the valve piston 22 above an inlet opening 57 which connects the first duct 26 via a valve chamber 58 with the valve seats 32, 33. The valve bore 20 is not shaped directly in the filter basket holding device, it rather extends in a cover 23 which is fastened in a stepped bore 24 provided in the filter basket holding device 2 sealed by means of a seal 25. At its larger diameter, the stepped bore 24 is connected through a first duct 26 with a steam boiler not illustrated in the drawing, and it reaches in the steam boiler until close to the bottom, in order to ensure that, even at a minimum water level, it is not steam but already water which is supplied to the first duct 26.

The end of the stepped bore 24 directed to the second filter 16 comprises a smaller-diameter annular step 27 which, simultaneously, forms the end of the stepped bore 24 representing the inlet to the brewing chamber 8. Abutting pressure-tightly on the annular surface 28 of the annular step 27 facing the valve piston 22 is a ring seal 29, which is kept in abutment on the annular surface 28 by a compression spring 30 that is supported under preload on an annular collar 31 formed on the valve piston 22.

The valve piston 22 penetrates the cover 23 in FIG. 1 through the valve bore 20 upwardly and comprises at its free end a convexly extending slide, on which both a first and a second actuating element 34 and 35 being configured as a first and a second ramp are abutting such that the valve piston 22 is pressed with its sealing seat 32 against the sealing seat 33 in opposition to the force of the compression spring 30, so that the duct 26 from the steam boiler to the brewing chamber 8 is closed.

The first ramp 34 is provided on the first lever 36 which, in turn, by way of a first bore 37 formed on it is pivoted on a peripheral surface 64 of a first axis 38 shaped as a peg and projecting upwardly from the cover 23 in FIG. 1. The first axis 38 extends substantially in parallel to the longitudinal axis 39 of the valve piston 22. The first lever 36 extends above the cover 23 substantially perpendicular to the longitudinal axis 39 of the valve piston 22.

In the right-hand area in FIG. 1, the free end 40 of the first lever 36 is angled off and extends substantially in parallel to .the longitudinal axis 39 of the valve piston 22. For the sake of simplicity, the free end 40 was placed into the drawing's plane, in order to be able to illustrate in one single cross-section also the course of the entire first lever 36. In reality, the free end 40 extends as is shown in FIG. 4. This free end 40 extends through a slot 41 formed in the filter basket holding device 2 and reaches the range of effect of a projection 11 shaped on the filter basket holder 1, once it is inserted into the filter basket holding device 2. The first ramp 34 is provided on a projection 43, which is arranged on the right side of the longitudinal axis 39 and is directed to the free end 42 of the valve piston 22 in FIG. 1.

According to FIGS. 1 and 4, a second lever 45 is pivoted below the first lever 36 on said's outside surface 44 forming the first bore 37 by way of a second bore 46 formed on a tubular portion 74. Hence the outside surface 44 serves as a second bearing axis of the second lever 45. On the right side of the centre line 13 of the axis 38, the second actuating element 35 abutting on the free end 42 of the valve piston 22 is designed on the second lever 45, the second abutment surface 73 of the said actuating element abutting on the free end 42 only in the closing position of the second lever 45 illustrated herein and likewise pressing the valve piston 22 against the valve seat 33. What is meant by the closing position of the first and the second lever 36 and 45, respectively, is that position in which the valve assembly 19 is closed.

While the first ramp 34 and the horizontally extending abutment surface 70 adjacent to the ramp 34 are arranged to the right of the centre line 39 of the valve piston 22 according to FIG. 1, the second ramp 35 and the horizontally extending abutment surfaces 72, 73 adjacent to the ramp 35 extend to the left of the longitudinal axis 39 of the valve piston 22. The horizontally extending line 71 in FIG. 1, which is shown in phantom lines on the first projection 43, represents the bottom end (FIG. 6) of the first ramp 34, from where a third abutment surface 71 may extend to the left, while the line 70 represents the upper end of the first ramp 34, from where the first abutment surface 70 succeeds to the right. The same applies to the second and fourth abutment surface 73, 72 adjoining on the second lever 45 on both sides of the second ramp 35. These abutment surfaces 70 to 73 serve for locking and bounding the valve piston 22 and the two levers 36, 45.

However, it is also possible that an abutment surface 70, 73 is provided on the first and the second lever 35, 45 for locking the valve piston 22 according to FIGS. 1 and 4 only in the position closing the valve assembly 19. That is to say, the abutment surface 72 arranged according to FIG. 4 on the other end of the second leg 68 serves to prevent the valve piston 22 from sliding out of the valve bore 20 in the open position of the valve 19. The third abutment surface 71 is thus formed on the first leg 65 of the first lever 36 solely by an edge, since it is not required when there is provision of the fourth abutment surface 72. However, in the absence of the fourth abutment surface 72, the third abutment surface 71 in full length is necessary corresponding to the maximum angle of rotation of the second lever 45 into its position required to produce steam. If, on the other hand, the valve piston 22 is secured against dropping out, neither the abutment surface 71 nor the abutment surface 72 is needed.

In order to secure the two levers 36, 45 axially in position on the first axis 38, a screw 48 is turned into a threaded bore 47 at the free end of the axis 38 and secures the first lever 36 axially on the cover 23 by way of a safety element 49. The first lever 36 also secures the second lever 45 axially in the position illustrated in FIG. 1, or, respectively, retains its end surface 69 in abutment on, or in close proximity to, an annular step 54 provided on the cover 23, on which step also the end surface 66 of the first lever 36 takes support. The second lever 45 projects with its free end 50 through an opening 52 out of the housing 51, which confines the filter basket holding device 2 upwardly and laterally, so that the second lever 45 can be operated by hand by virtue of the free end 50 forming the handle.

The filter basket holding device 2 illustrated in FIG. 2 differs from that in FIG. 1 only in that a differently constructed valve assembly 19 and, related thereto, a variation of the lever assemblies 36 and 45 have been chosen. The valve seat 33 on the housing is arranged on a tubular end 55 provided on the cover 23, while on the end's area close to the annular step 27 the valve seat 32 extends conically and tapers upwardly, when viewed in the drawing. In the area of the largest diameter of the stepped bore 24, the tubular end 55 of the cover 23 is sealed by means of an O-ring 56 in relation to the stepped bore 24. Interposed between the ring seal 25 and the O-ring 56, an inlet opening 57 is arranged on the tubular end 55 of the cover 23 and establishes the connection between the first duct 26 and the valve chamber 58 of the valve bore 20. Said valve chamber 58 communicates via a bore 59 provided on the tubular end 55 with the valve seats 32, 33 which, in turn, with the valve 19 open, that is with the valve seats 32, 33 being spaced from one another, are connected with the distribution chamber 61 through the chamber 60 and the smaller-diameter stepped bore 24.

At the end of the valve piston 22, which is on the bottom in FIG. 2 and is adjacent to the valve chamber 58, a cylindrical pin 62 is shaped, which penetrates the valve chamber 58 and the bore 59 and is provided with a truncated cone 63 at its end projecting into the second chamber 60, the said cone tapering upwardly in the drawing and its conical peripheral surface forming the valve seat 32 of the valve piston 22.

In the valve assembly 19 according to FIG. 2, the second lever 45 is pivoted by way of its bore 46, in contrast to FIG. 1, on the peripheral surface 64 of the first axis 38, while the first lever 36 is pivoted by way of its bore 37 on the cylinder-side outside surface 53 of the second lever 45, so that the outside surface 53 forms the real axis for the first lever 36.

In contrast to FIG. 1, the first lever 36 in FIG. 2 is arranged below the second lever 45 and is confined by said towards the top. On the leg 65 close to the second lever 45, the first actuating element 34 in the form of a first ramp is provided on the first lever 36, while directly above on the second leg 68 of the second lever 45 the second actuating element 35 is provided in the form of a second ramp, which is somewhat, or not at all, in sliding contact with the first ramp 34 in the closing position of both levers 36, 45. That is to say, the second ramp 35 is almost entirely turned out of the range of effect of the valve piston 22 and, therefore, is not illustrated in a hatched way in the longitudinal cross-sectional view of the valve piston 22 in FIG. 2, but it can be seen in the background. Since the first ramp 34, too, has been turned out of the drawing's plane, yet in opposite direction, it is not perceptible in full height.

As becomes apparent from FIG. 2, an annular gap (a) is provided between the annular step 54, shaped on the cover 23 and forming the transition to the first axis 38, and the end surface 66 close to the annular step 54, which gap is required to the end that the first lever 36 can displace axially downwardly in the drawing, once the first and the second lever 36, 45 are moved to adopt their position opening the valve assembly 19. When one of the two levers 36 and 45 is moved into its position closing the valve assembly 19, the valve piston 22 will be moved upwardly in FIG. 2 by the force of the spring 30 alone and, in doing so, entrains the second lever 36 upwardly by way of its convexly extending slide 42 and the outer boundary wall 67 provided on the leg 65.

In FIG. 3, the support and the arrangement of the first and the second lever 36, 45 have been omitted for the sake of simplicity, since this arrangement corresponds to the arrangement illustrated in FIG. 2 and hence functions identically. The valve assembly 19, too, corresponds basically to the valve assembly 19 shown in FIG. 2, except for that, instead of the conical design of the valve seats 32, 33 according to FIG. 2, a valve seat arrangement 32, 33 was chosen in FIG. 3, which extends perpendicular to the longitudinal axis 39 of the valve piston 22.

In order to accomplish a proper sealing of the valve piston 22 in relation to the cover 23 in FIG. 3 as well, a seal 76 is provided between the valve seats 32, 33. Further, the cylinder pin 62 shown in FIG. 2 is substituted with a tubular extension having the same reference numeral, in whose inner space 77 a compression spring 30 is incorporated. Said compression spring 30 takes support on the end 78 of the blind-end bore 79 confining the inner space 77 on the one side and on the annular step 27 on the other side.

Another difference compared to the valve assembly 19 according to FIG. 2 resides in that the O-ring 56 is pressed by the cover 23 against an annular step 80 provided on the filter basket holding device 2. Like in FIG. 2, the cover 23 is tightly screwed into the stepped bore 24 having the largest diameter by a thread 81.

In FIG. 3, the valve piston 22 recedes in diameter in the area below the first duct 26 to ensure that the water can flow out through this portion 82 to the distribution chamber 61 when the valve 19 is open. In order to prevent the occurrence of explosion-like ejections of water on the second filter 16 (FIG. 2), projecting ribs 83 are arranged below the portion 82 on the valve piston 22 being spread evenly over said's periphery, the external diameter of which ribs extends up to the wall of the stepped bore. The slots 84 formed by two neighbouring ribs and extending along the longitudinal axis 39 of the valve piston 22 form a reducing valve operating as a throttle in the passage from the first duct 26 to the distribution chamber 61.

It can be gathered from FIG. 4 in conjunction with FIG. 1 that the free end 40 of the first lever 36 abuts on an entraining surface 85 configured as an entraining means on the projection 11 of the filter basket holder. The position of the filter basket holder 1 shown in FIG. 4, on which an outwardly stretching handle 86 is attached, represents especially that position in which the filter basket holder i is to be introduced with its projections 11 into the openings 90 of the bayonet lock arrangement, that means it is not yet brought into its closed position by means of the groove 12. In this position, the entraining surface 85 abuts on the free end 40 of the first lever 36 straightly or after a slight turning in the closing direction. In this position, the valve piston 22 according to FIGS. 4 and 6 is still retained in its closing position by the abutment surface 70. The same applies to the second lever 45 once it has adopted the position it has in FIGS. 4 and 6.

FIGS. 7 to 10 depict merely the two end positions possible for the two levers 36 and 45. With the exception of the position shown in FIG. 7 where the valve piston 22 assumes its opening position, the valve piston 22 is always in its position closing the valve assembly 19 in FIGS. 8 to 10. Since FIGS. 7 to 10 always illustrate the same component parts, reference numerals have been inserted in FIG. 7 only for the sake of simplicity.

The mode of function of the espresso coffee machine according to the present invention is as follows:

In FIGS. 1 and 4 to 6, the first lever 36 is still in its initial position closing the valve assembly 19 and the second lever 45, too, is in its initial or, respectively, closing position closing the valve assembly 19. Both levers 36, 45 being in the position shown herein, no water may flow through the first duct 26 to the distribution chamber 61, and hence not either to the brewing chamber 8. That is to say, espresso cannot be made in this position. If the steam boiler is heated up nevertheless, and provided a second duct is arranged irrespective of the first duct 26, steam can flow out of said second duct via a steam valve and from there to a steam outlet so that cold beverages can be steamed and frothed. In order that the second duct delivers steam exclusively, the inlet of the second duct 26 must be arranged above the maximum water level in the steam boiler.

When the filter basket holder 1 with its two diametrally opposite projections 11 is introduced by an axial movement into the groove 12 of the filter basket holding device 2, but is not yet turned, the position of the filter basket holder 1 and of the first lever 36 shown in FIG. 4 results. When, according to FIG. 4, the filter basket holder 1 is turned counterclockwise so far that the annular collar 9 of the filter basket 5 is in pressure-tight abutment on the ring seal 14, the imaginary centre line 87 and thus the middle of the free end 14 of the first lever 36 moves roughly until the dash-dot line 88. That is to say, corresponding to this angle of rotation, the filter basket holder 1 through its entraining surface 85 has turned the free end 40 of the first lever 36. Since during this turning the first leg 65 and hence the abutment surface 70 as well as the first ramp 34 have also been turned counterclockwise, that means in the direction U according to FIG. 6, the first ramp 34—as is shown by the broken line 91 in FIG. 6—will now be at a distance below the free end 42 of the valve piston 22 without being in sliding engagement with said; however, this is the case only because the second lever 45 was not turned in the direction U, that means, it is still in its initial position closing the valve assembly 19 according to FIG. 4. When the filter basket holder 1 is introduced properly into the filter basket holding device 2, this position permits that exclusively steam can be produced, which will then exit through the additional steam duct, as has been described already hereinabove, when, in addition, a steam valve not shown in the drawing is open.

Consequently, in order to be able to make an espresso coffee when the filter basket holder 1 is introduced properly, the second lever 45 by way of its free end 50 must still be turned by hand counterclockwise until it adopts the position shown by the centre line 89. On this turning, the valve piston 22 can now slide over the abutment surface 73 on the ramp 35 up to the abutment surface 72 according to the dash-line illustration according to FIG. 5 so that, according to FIG. 1, it is moved upwardly by the force of the compression spring 30 and its sealing seat 32 releases the sealing seat 33. The valve assembly 19 is open in this position, and the pressurized water in the steam boiler can flow from the first duct 26 via the valve seats 32, 33 to the smaller diameter of the valve bore 24, from where it propagates into the distribution chamber 61 and flows evenly into the brewing chamber 8 through the second filter 16. Since the hot water is subjected to pressure, it will be pressed through espresso coffee grounds, provided the brewing chamber 8 is filled therewith, and extracts the espresso coffee grounds. The espresso coffee is then conveyed through the passages 7 provided on the bottom 6 of the filter 5 to the outlet 4, from where it can pour into a cup placed underneath.

When the filter basket holder 1 is turned out of the filter basket holding device 2 for removing the spent espresso coffee grounds after espresso coffee has been made, a spring making catch on the first lever 36, which is not illustrated in the drawing, must ensure that the first lever 36 automatically returns to its position closing the valve 19, when the free end 40 of the first lever 36 is only loosely abutting on the entraining surface 85, as is shown in FIG. 4.

If, for example, a user has not introduced the filter basket holder 1 into the filter basket holding device 2, the first lever 36 will maintain the position shown in FIGS. 1, 4 and 6, that means the valve piston 22 is kept in its closing position by the abutment surface 70. When now a user operates by hand the Second lever 45 by way of its free end 50 counterclockwise according to FIG. 4, that is in the direction U, it is possible that, although the second ramp 35 has released the valve piston 22, the said is not either allowed to reach its opening position, since the abutment surface 70 continues to keep the valve piston 22 in its closing position when the filter basket holder 1 is not in its proper seat.

That means that, although the second lever 45 was moved into its opening position serving to make espresso coffee and characterized by the centre line 89, boiling water is not allowed to exit into the atmosphere through the second filter 16 in case the filter basket holder 1 is not introduced. Owing thereto, unpleasant burns will be avoided which occur if, for instance, the hand of a user is below the second filter 16, or close thereto. Only after the filter basket holder 1 has assumed its proper closing position, for the attaining of which the first lever 36 must be turned about the angle A and, simultaneously, the second lever 45 was moved into its opening position, is hot water allowed to exit through the valve assembly 19, however, in this case only through the brewing chamber 8 which is shielded outwardly.

In the lever assembly 36, 45 coupled to the valve assembly 19 according to FIGS. 1 and 4 to 6, both levers 36, 45 are turned counterclockwise in order to reach the open position of the valve assembly 19.

In the embodiment of a second valve assembly 19 with the pertaining levers 36, 45 illustrated in FIGS. 2 and 7 to 10, the filter basket holder 1—like in the valve assembly 19 according to FIG. 1—is turned into a bayonet lock arrangement furnished with a right-hand thread, that means likewise in counterclockwise direction. According to FIG. 2, the second lever 45 is turned clockwise, that is opposite to the first lever 36, from its position closing the valve assembly 19 into its position opening the valve assembly 19 for making espresso coffee. Thus, the second lever 45 does not assume the initial position shown in FIG. 4, but it adopts as initial position the end position on the centre line 89 shown therein. However, for the sake of simplicity, a drawing corresponding to the first embodiment according to FIG. 4 was not drafted for the second embodiment. FIGS. 7 to 10 depict the four possible positions of the two levers 36, 45 in correlation to each other.

In FIGS. 2 and 10, the filter basket holder 1 is not introduced into the filter basket holding device 2, and the second lever 45 is disposed in its initial position which serves exclusively for producing steam. In this position, the valve piston 22 through the first leg 65 has lifted the first lever 36 upwards by the amount (a) by virtue of the preloading force of the compression spring 30, since the second leg 68 of the second lever 45 is in its initial position and does not act upon the first leg 65. Consequently, it is only steam which can be produced in this position, as has been described already in the first embodiment.

When, according to FIG. 9, the second lever 45 is turned clockwise, that means from its position according to FIG. 10 to the left into the position according to FIG. 9, the second ramp 35 will abut straight on the first ramp 34, without displacing the first leg 65 and thus the first lever 36 according to FIG. 9 downwardly together with the valve piston 22. That means, although the second lever 35 is in its end position which serves to produce espresso coffee, no espresso coffee can be .made, since the filter basket holder 1 is not introduced into the filter basket holding device 2. In this position, again, only steam can be produced.

When, in FIG. 8, the second lever 45 adopts its initial position, as is the case in FIG. 10 as well, and when the filter basket holder 1 is introduced properly into the filter basket holding device 2, it will entrain the first lever 36 in counterclockwise direction according to FIG. 1, consequently, to the right according to FIG. 8. However, since the first lever 36 is not acted upon by the second lever 45 due to the latter being in its initial position, its boundary wall 67 will slide along the convex slide 42 of the valve piston 22, without the first lever 36 and, thus, the valve piston 22 being displaced downwardly by the amount (a) according to FIG. 8. In this position, too, only steam can be produced.

When the second lever 45, after turning to the left according to FIG. 7, has assumed its position which serves to make espresso coffee and which corresponds also to the position according to FIG. 9, and when now the filter basket holder 1 is inserted into the filter basket holding device 2 and is turned into its closing position, the entraining surface 85 formed on the projection 11 will abut on the free end 40 of the first lever 36—in a like manner as is illustrated in FIG. 1—and swivels it counterclockwise, that is to the right in FIG. 7. First, its ramp 34 will abut on the ramp 35, exactly as is the case in FIG. 9. When the first lever 36 is turned further, it displaces by the amount (a) towards the cover 23 on the housing and, in doing so, shifts the valve piston 22 into the valve bore. According to FIG. 2, the truncated cone 63 lifts with its sealing seat 32 from the sealing seat 30 and releases the first duct 26 to the distribution chamber 61. Hot water is now permitted to flow from the pressure reservoir into the brewing chamber, and espresso coffee can be made in case there is espresso coffee grounds in the brewing chamber 8.

When, according to FIG. 7, one of the two levers 36, 45 is moved back to its initial position again, the valve piston 22 is caused by the force of the spring to shift the first lever 36 upwards by the amount (a), and the valve assembly 19 is closed again. To prevent the two legs 65, 68 from being turned completely out of the range of effect of the valve piston 22, the rotating movements of both levers 36, 45 are confined by stops not illustrated in the drawing. In order that the first lever 36 always will move reliably back by the amount (a), what is normally intended by the spring 30 and the first ramp 34, additionally, a compression or tension spring can still be provided, which makes catch directly on the first lever 36.

I claim:

1. An espresso coffee machine comprising an electrically heatable water heater, a filter basket holder, and a filter basket holding device which can be sealingly closed by introducing therein the filter basket holder, said filter basket holder being subdivided by a filter into a brewing chamber that can be filled with coffee grounds and into a pouring device arranged at its bottom, and wherein said coffee machine further comprises a first duct and a second duct having a steam outlet, said first duct opening into the filter basket holding device so as to connect the brewing chamber to the water heater, wherein said first duct includes a throughflow controlling valve arranged therein and which is always closed when the filter basket holder is not inserted into the filter basket holding device, wherein, after the insertion of the filter basket holder into the filter basket holding device, said filter basket holder causes the valve to move from its closed into an open position, wherein a first actuating member is provided between the filter basket holder and the valve which is actuated by the filter basket holder to control the valve, and wherein steam can be taken from the espresso coffee machine through said second duct in order to steam and froth beverages, the said steam being produced in the water heater as well, and wherein in addition to the first actuating member, a second actuating member is provided which also serves to control the valve, and wherein said first and second actuating members have open and closed positions and wherein the valve opens only if both the first and the second actuating member have adopted their open position.

2. An espresso coffee machine as claimed in claim 1 wherein the insertion of the filter basket holder is performed by an axial displacement directed towards the filter basket holding device, wherein the first actuating member is a turning lever, one end of which is so tilted about a point of support due to the axial displacement which occurs when the filter basket holding device is closed by the filter basket holder that an actuating element formed at the turning lever opens the valve.

3. An espresso coffee machine as claimed in claim 1 further comprising a lock arrangement into which the filter basket holder is inserted and turned in a closing movement to lock it therein and wherein the filter basket holder includes projections and the first actuating member comprises a first lever rotatable about an axis and a first actuating element formed on said first lever, said first lever having a free end, wherein during the closing movement of the filter basket holder said projections contact the free end of the first lever and cause said first lever to rotate about said axis in such a manner that said first actuating element opens the valve.

4. An espresso coffee machine as claimed in claim 3 wherein said filter basket holder includes a recess formed therein and wherein when the filter basket holder is inserted into said lock arrangement, the free end of the first lever is engaged into said recess.

5. An espresso coffee machine as claimed in claim 3 wherein said projection provided on the filter basket holder functions as an entraining means for the free end of the first lever and wherein said coffee machine further comprises a spring acting on the first lever to automatically return the first lever into an initial position closing the valve when the filter basket holder is detached from the filter basket holding device.

6. An espresso coffee machine as claimed in claim 3 wherein said filter basket holding device comprises a housing and wherein the valve comprises a valve piston, which is axially slidable in the housing of the filter basket holding device, a valve seat that is opened and closed by the valve piston, and a spring acting upon the valve piston for the purpose of automatic opening of the valve when the filter basket holder is inserted and locked into said filter basket holding device, wherein a free end of the valve piston projects from the housing of the filter basket holding device and is sealed in relation to the housing, wherein with the valve closed, the first actuating element formed on the first lever abuts on the free end of the piston and presses said piston against a valve seat formed in the filter basket holding device, while, for opening the valve, the free end of the first lever is turned by the filter basket holder such that the first actuating element moves out of the range of effect of the valve piston and the valve piston lifts from the valve seat.

7. An espresso coffee machine as claimed in claim 6 wherein an area of the actuating element on the first lever facing the free end of the valve piston is a slide designed as a first ramp, and wherein the first ramp increases its distance from the free end of the valve piston in a closing direction of the filter basket holder.

8. An espresso coffee machine as claimed in claim 7 wherein adjacent to the first ramp on both sides is a slide in the form of horizontally extending abutment surfaces which extends perpendicular to a longitudinal axis of the valve piston, and wherein the two horizontally extending abutment surfaces are disposed within a closing angle (A) of the filter basket holder.

9. An espresso coffee machine as claimed in claim 8 wherein the filter basket holding device includes a sealing joint and the filter basket holder includes a stop arranged radially outside of said sealing joint and wherein the first lever extends substantially perpendicular to the longitudinal axis of the valve piston and the axis of the first lever, wherein the free end of the first lever extends towards the filter basket holder, is angled off in relation to a horizontally extending area of the first lever, and extends in parallel to the longitudinal axis of the piston and the axis of the first lever, and wherein the free end of the first lever is movable into operative engagement with the stop provided on the filter basket holder.

10. An espresso coffee machine as claimed in claim 9 wherein the filter basket holder includes on a side thereof a lock element which engages with the lock arrangement when the filter basket holder is coupled with the filter basket holding device, and wherein the lock element functions as a stop for the free end of the first lever.

11. An espresso coffee machine as claimed in claim 1 further comprising a lock arrangement, wherein the filter basket holding device comprises a housing, the filter basket holder includes projections, the first actuating member comprises a first actuating element, and the second actuating member comprises a second actuating element, wherein both said first and second actuating elements are movable so as to come into contact with the valve, wherein when the filter basket holder is inserted into said filter basket holding device and turned the projections engage into the lock arrangement, wherein the first actuating member is a first lever and the second actuating member is a second lever, both of said first and second levers being rotatable about a first axis, wherein the valve comprises a valve piston axially slidable in the housing of the filter basket holding device, a valve seat which is opened and closed by the valve piston, and a spring acting upon the valve piston for the purpose of automatically opening of the valve when the filter basket holder is locked into the filter basket holding device, wherein the valve piston at a free end thereof is adapted to be acted upon by each one of the first and second actuating elements on the first and second levers, wherein the valve is sealed in relation to the housing of the filter basket holding device, wherein with the valve closed, the first and/or the second actuating element abut with preload on the free end of the valve piston, while, for opening the valve, the first and the second actuating element are disposed outside a range of effect on the free end of the valve piston by a free end of the first lever being turned by the filter basket holder, and by the second actuating element, when turned, also moving out of a range of effect on the valve piston.

12. An espresso coffee machine as claimed in claim 11 wherein a first area on the first actuating element and a second area on the second actuating element which faces the free end of the valve piston, wherein the first area is a first slide designed as a first ramp and, the second area is a second slide designed as a second ramp, and wherein a distance of the first and the second slide is increased in relation to the free end of the valve piston in a closing direction of the filter basket holder.

13. An espresso coffee machine as claimed in claim 12 wherein the first and the second ramp extend substantially in a same plane and in parallel to each other in a closing position of the first and the second lever.

14. An espresso coffee machine as claimed in claim 13 wherein the second lever is pivoted on a second axis arranged on the first lever, and wherein the first and second ramps of the first and the second lever, respectively, when viewed from the first axis extend concentrically relative to each other and radially one behind the other, and are opposed to the free end of the valve piston.

15. An espresso coffee machine as claimed in claim 13 wherein the second lever is operable by hand.

16. An espresso coffee machine as claimed in claim 11 wherein said first lever has a first bore and said second lever has a second bore and wherein said coffee machine further comprises a peg defining the first axis and supporting the first lever by way of the first bore, and wherein the first lever comprises a cylindrical peripheral surface on an outside wall of the first bore, on which surface the second lever is supported by way of the second bore.

17. An espresso coffee machine as claimed in claim 16 wherein the distance between the second ramp of the second lever and the first axis is less than the distance between the first ramp of the first lever and the first axis.

18. An espresso coffee machine as claimed in claim 17 wherein the first lever is supported on the first axis above the second lever, and wherein, outside the second lever in an area of the valve piston, a first projection is formed on the first lever which represents the first actuating element, which is directed towards the valve piston and on the end surface of which close to the valve piston the first ramp is provided.

19. An espresso coffee machine as claimed in claim 1 further comprising a lock arrangement, wherein the filter basket holding device comprises a housing, the filter basket holder includes projections the first actuating member comprises a first actuating element and the second actuating member comprises a second actuating element, both first and second actuating elements controlling the valve, wherein the filter basket holder is inserted by being turned by way of projections into the lock arrangement, wherein the first actuating member is a first lever and the second actuating member is a second lever, both of said first and second levers being pivoted on a first axis, wherein the valve comprises a valve piston axially slidable in the housing of the filter basket holding device and a valve seat which is opened and closed, respectively, by the valve piston, wherein the valve piston on a free end thereof is acted upon by each one of said first and second actuating elements on the first and the second levers, wherein the valve is sealed in relation to the housing, wherein the first lever additionally is arranged to be slidable towards the valve piston, wherein after one of the first and second levers has turned into a position serving to open the valve and the other of said first and second levers is also turned to assume an opening position serving to open the valve, both first and second actuating elements of the first and second levers act upon each other such that the first lever is displaced in the opening direction of the valve piston on a second axis arranged on the second lever and opens the valve thereby.

20. An espresso coffee machine as claimed in claim 19 wherein the area of the first actuating element on the first lever, which area faces the second lever, is a first slide formed as a first ramp, and wherein the first ramp has a descent, when viewed in a closing direction of the filter basket holder.

21. An espresso coffee machine as claimed in claim 20 wherein a second ramp designed as a second slide is provided on an area of the second lever facing the first lever, and wherein the second ramp extends substantially in parallel to the first ramp.

22. An espresso coffee machine as claimed in claim 20 wherein the second lever is pivoted directly on the first axis, and the first lever is pivoted on the second axis arranged on the second lever.

23. An espresso coffee machine as claimed in claims 21 or 22 wherein for opening the valve, the direction of rotation of the first lever is opposite to the direction of rotation of the second lever.

24. An espresso coffee machine as claimed in claims 18 or 22 wherein the filter basket holding device includes a sealing joint, wherein the filter basket holder includes a stop, wherein the first lever extends substantially perpendicular to the longitudinal axis of the valve piston and the first axis, wherein a free end of the first lever extends towards the filter basket holder, is angled off in relation to a horizontally extending area of the first lever and extends in parallel to the longitudinal axis of the piston and the first axis, and wherein the free end of the first lever is movable into operative engagement with the stop on the filter basket holder, which stop is arranged on the filter basket holder radially outside the sealing joint on the filter basket holding device.

25. An espresso coffee machine as claimed in claim 20 wherein for opening the valve, both first and second levers have the same direction of rotation.

26. An espresso coffee machine as claimed in claim 1 further comprising a throttle operating as a reducing valve arranged in the first duct in the valve or downstream thereof towards the brewing chamber.

27. An espresso coffee machine as claimed in claim 26 wherein an opening cross-section of the valve is sized so large that it forms the throttle itself.

* * * * *